Aug. 18, 1942.　　　J. G. TOVAR　　　2,293,480
HIGH FREQUENCY AMPLIFIER
Filed Oct. 30, 1940

Inventor,
Jorge Guzman Tovar
By
Attorney

Patented Aug. 18, 1942

2,293,480

UNITED STATES PATENT OFFICE 2,293,480

HIGH FREQUENCY AMPLIFIER

Jorge Guzman Tovar, Mexico City, Mexico

Application October 30, 1940, Serial No. 363,550
In Mexico March 31, 1937

7 Claims. (Cl. 250—20)

The present invention relates to the amplification of signals of relatively high frequency.

More particularly, the present invention relates to the amplification of currents such as used in radio, telephonic and radio telegraphic signals, these currents having been rectified by a rectifier of the type more particularly disclosed and claimed in my co-pending application, Serial No. 336,846, filed May 23, 1940, and application Serial No. 199,010, filed March 30, 1938, the present application being a continuation in part of these aforementioned prior applications.

One of the objects of the present invention therefore is the provision of a novel amplifying circuit, including a novel form of amplifying transformer.

Another object of the present invention is the provision of an amplifying circuit including a transformer having a pair of windings in circuit with a neon tube and a novel rectifier.

A third object of the present invention is the provision of a novel radio circuit, including a pair of oppositely wound primary transformer coils mounted on an easily saturated core.

A fourth object of the present invention is the provision of an amplifier, including a pair of coils wound in opposed direction on the branches of a multiple core, and a secondary coil wound about both of the core branches and adapted to be energized from a local source of current.

Other objects and advantages of the present invention will appear from the more detailed description in the specification and drawing and the claims appended hereto.

Referring to the drawing.

Figure 1:
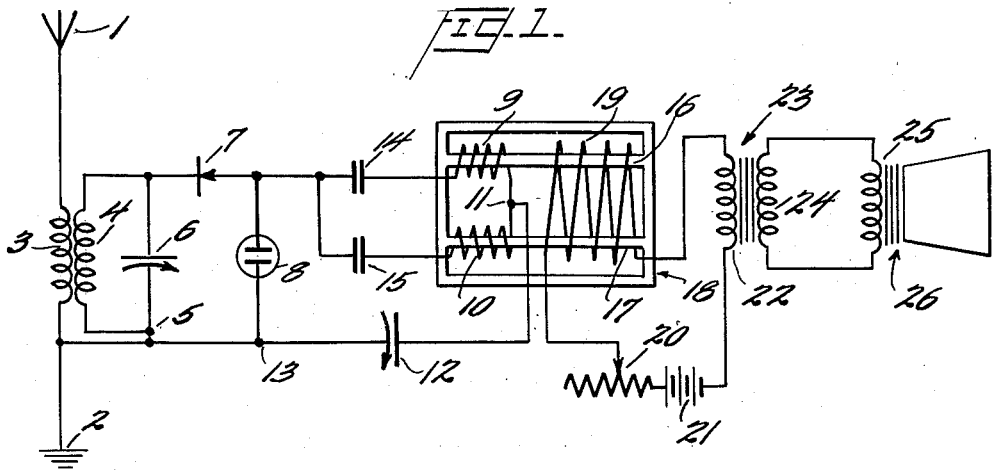
Figure 1 is a simplified radio circuit, illustrating the novel amplifier of the present invention.

Referring to Fig. 1, the reference numeral 1 designates an antenna which is suitably connected with the ground 2 through the usual primary radio frequency coil 3. It is to be noted that the antenna may be of any of the usual types, such as the single strand antenna. Wound on the same air core with the primary coil 3 is a secondary radio frequency coil 4, connected to ground at 5, and tuned by the variable condenser 6, which is connected in parallel circuit to the coil 4. It is to be noted that the elements thus far described constitute the simplest form of tuned radio frequency circuit, and that any of the well known tuned circuits may be substituted therefor. One of the ends of the condenser 6 and coil 4 is connected to one side of the rectifier 7, and the other side of the rectifier is connected respectively to one side of a neon tube 8 and one side of a pair of coils 9 and 10, respectively. The other side of the coils is connected, as indicated at 11, to one side of a variable condenser 12, the other side of which is connected to ground. One side of the neon tube 8 is also connected to ground, as indicated at 13. Interposed between the detector 7 and the coils 9 and 10 is a pair of fixed condensers 14 and 15. It is to be noted from Fig. 1 that the coils 9 and 10 are connected in parallel, and that they are oppositely wound on the core members 16 and 17, the core members 16 and 17 being joined by a frame indicated in general at 18. Wound about both the core members 16 and 17 is a coil 19 which may be considered to be the secondary of an amplifying transformer, including the coils 9 and 10, the cores 16 and 17 and the frame 18. The coil 19 is connected in series with a variable resistance 20, battery 21, and the primary 22 of a transformer, indicated in general at 23. The secondary 24 of the transformer 23 is connected in circuit with the voice coil 25 of a conventional type of speaker, indicated in general at 26. It is desired to point out that the core members 16 and 17 and the frame 18 are formed from a suitable metal alloy requiring a minimum of current through the coils 9 and 10 for saturation.

It is therefore evident from the foregoing that when a modulated radio frequency signal is received in the antenna 1 and passed through the coil 3, a corresponding current will be set up in the tuned secondary coil 4 and in the circuit, including the rectifier or detector 7, the coils 9 and 10, the condenser 12 and the neon tube 8.

As previously pointed out, the coils 9 and 10 are wound in opposite directions upon the core portions 16 and 17. It has been found that when the coils 9 and 10 are so wound, and the magnetic field set up in the core portions is set up in two different directions that the back E. M. F. set up in the circuit including the coils 9 and 10 is reduced to a minimum. Thus, for a sufficient number of turns the assembly functions as though the coils 9 and 10 were a single coil having an air core. The magnetic field therefore, set up within the core portions 16 and 17 and the frame 18 joining the ends of the core portions 16 and 17 is circular in nature.

It will be noted that the neon tube 8 is positioned in parallel with the coils 9 and 10 and, therefore, constitutes a parallel path for current passing through the rectifier or detector 7. This provision of a parallel path consisting of periodic discharges through the neon tube 8 prevents charges from being bound in the branch circuit including the coils 9 and 10 which, as shown, are only connected to ground through the condenser 12. The current set up in the circuit will therefore, probably consist of periodic surges through the coils 9 and 10 alternated with periodic discharges across the neon tube 8, and the primary amplifying circuit therefore consisting of the coils 9 and 10, the condenser 12 and the neon tube 8 will have produced therein a full wave, pulsating current somewhat similar in character to the current produced in the relay amplifier described in the copending application, Serial No. 336,846, previously mentioned.

It is apparent, therefore, from the foregoing, that the extent of the saturation of the core comprising core members 16 and 17 and frame 18 will depend on the current set up in the primary circuit just hereinbefore described. Since the secondary amplifying coil 19 is wound about both of these core members, there will be produced in the secondary circuit including the resistance 20, the battery 21, the primary audio transformer winding 22 and the coil 19, a current corresponding to the current in the primary amplifying circuit mentioned. A corresponding alternating current will then be produced in the secondary 24 of the audio transformer 23 and in the circuit including the secondary 24 and the voice coil 25 of the speaker 26. It may be noted further, that the function of the condenser 12 in the primary circuit is to balance the discharge of the neon tube 8 with the current in the coils 9 and 10.

Figure 2:
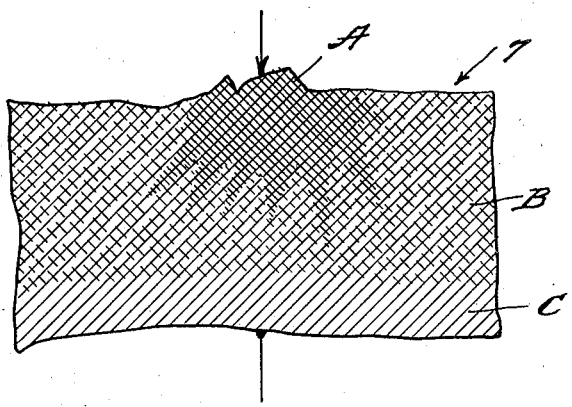
Fig. 2 is a diagrammatic illustration of the novel rectifier and detector adapted to be used in the radio circuit of Fig. 1.

Referring to Fig. 2, there is shown in detail a novel rectifier or detector 7 which is especially adapted for use with a radio circuit of Fig. 1, this rectifier or detector being described in detail and claimed in the copending application, Serial No. 336,846. Briefly, the detector consists of a central portion A, consisting predominantely of a selenium-containing entity, a second layer B containing more or less selenium but consisting primarily of lead or a third layer or bottom layer C consisting almost entirely of pure lead. The composite selenium containing detector is preferably made by dropping a pellet of selenium within a suitable mass of molten lead, as described in the aforementioned copending application. Further, the detector is preferably placed in a radio circuit, and currents passed therethrough for a considerable period of time in order to achieve its full efficiency, as set forth in the copending application, being preferably of the order of twelve (12) hours. It is characteristic of this type of detector that it is capable of passing and rectifying from an ordinary antenna, a very substantial amount of current, this amount of current being approximately 1 to 2 milliamperes, and approximately 70 to 90 volts from the ordinary antenna. Currents of this character are sufficient to operate the amplifying circuit hereinbefore described, and although as pointed out this amplifying circuit is particularly designed for operation with a detector of this character and for use in radio work, it is to be understood that the amplifying circuit hereinbefore described is actually capable of other uses and particularly where the current values are analogous to those hereinbefore set forth. Thus, the amplifying circuit may be employed with other detectors of a similar character, and may be employed with or without the detector for telephone work.

What is claimed is:

1. An amplifier for high frequency currents comprising an input circuit, a pair of branch circuits each including a primary coil, said branch circuits being disposed in parallel with a gaseous discharge tube and connected across said input circuit in series with a high frequency source, a magnetic core, a secondary coil in series circuit with a current source and an output means, said core being easily saturated and disposed in close proximity to said primary coils and said secondary coil so that the current output from said last mentioned circuit will be responsive to current changes through said secondary coil effected by a decrease or increase of saturation in said core produced by said primary coils.

2. An amplifier for high frequency currents comprising an input circuit, a pair of branch circuits each including a primary coil oppositely wound relative to the other primary coil, said branch circuits being disposed in parallel with a gaseous discharge tube and connected across said input circuit in series with a high frequency source, an easily saturated magnetic core consisting of a pair of parallel core members connected at each of their ends by bridging members so as to establish a continuous circular path for magnetic flux, each of said core members extending through one of said primary coils, and a secondary coil in circuit with a current source and an output means, said secondary coil being wound about both of said core members.

3. A system for the detection and amplification of radio signals comprising a circuit for receiving said signals, a detector in said circuit and an amplifier comprising a pair of branch circuits each including a primary coil, said branch circuits being disposed in parallel with a gaseous discharge tube and connected across said first mentioned circuit in series with said detector, a magnetic core, a secondary coil in series circuit with a current source and an output means, said core being easily saturated and disposed in close proximity to said primary coils and said secondary coil so that the current output from said last mentioned circuit will be responsive to current changes through the coil effected by a decrease or increase of saturation in said core produced by said primary coils.

4. A system for detection and amplification of radio signals comprising a circuit for receiving said signals, a detector in said circuit, an amplifier comprising a pair of branch circuits each including a primary coil oppositely wound relative to the other primary coil, said branch circuits being disposed in parallel with a gaseous discharge tube and connected across said first mentioned circuit in series with said detector, a variable condenser inserted between said primary coils and ground, a magnetic core, a secondary coil in circuit with a current source and an output means, said core being easily saturated and disposed in close proximity to said primary coils and said secondary coil so that the current output from said last mentioned circuit will be responsive to the current through the coil effected by decrease or increase of saturation in said core produced by said primary coils.

5. A system for detection and amplification of radio signals comprising a circuit for receiving said signals, a detector in said circuit, an amplifier comprising a pair of branch circuits each including a primary coil oppositely wound relative to the other primary coil, said branch circuits being disposed in parallel with a gaseous discharge tube and connected across said first mentioned circuit in series with said detector, an easily saturated magnetic core consisting of a pair of parallel core members connected at each of their ends by bridging members so as to establish a continuous circular path for magnetic flux, each of said core members extending through one of said primary coils, and a secondary coil in series with a current source and an output means, said secondary coil being wound about both of said core members.

6. A system for detection and amplification of radio signals comprising a circuit for receiving said signals, a detector in said circuit and an amplifier comprising a pair of branch circuits each including a primary coil, said branch circuits being disposed in parallel with a gaseous discharge tube and connected across said first mentioned circuit in series with said detector, a condenser in said circuit between one end of said primary coils and ground, a core member, a secondary coil in series circuit with a current source and an output means, said core being easily saturated and disposed in close proximity to said primary coils and said secondary coil so that the current output from said last mentioned circuit will be responsive to current changes through the coil effected by a decrease or increase of saturation in said core produced by said primary coils.

7. A system for detection and amplification of radio signals comprising a tuned circuit for receiving said signals, a detector in said circuit, an amplifier comprising a pair of branch circuits each including a primary coil oppositely wound relative to the other primary coil, said branch circuits being disposed in parallel with a gaseous discharge tube and connected across said tuned circuit in series with said detector, a variable condenser connected to said oppositely wound primary coils at the ends thereof remote from said detector, at one of its sides and to ground at its other side, an easily saturated magnetic core consisting of a pair of parallel core members connected at each of their ends by bridging members so as to establish a continuous circular path for magnetic flux, each of said core members extending through one of said primary coils, and a secondary coil in series circuit with a local current source and an output, said secondary coil being wound about both of said core members so that the passage of current from said local source through said secondary coils will be effected by an increase or decrease of saturation in said core resulting from the action of said primary coils.

JORGE GUZMAN TOVAR.